United States Patent
Bayer et al.

(10) Patent No.: US 9,862,827 B2
(45) Date of Patent: Jan. 9, 2018

(54) POLYAMIDE MOULDING COMPOSITIONS, PROCESS FOR PRODUCTION THEREOF AND USE OF THESE POLYAMIDE MOULDING COMPOSITIONS

(71) Applicant: EMS-PATENT AG, Domat/Ems (CH)

(72) Inventors: Andreas Bayer, Domat/Ems (CH); Botho Hoffmann, Domat/Ems (CH); Nikolai Lamberts, Bonaduz (CH); Philipp Harder, Chur (CH); Manfred Hewel, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 153 days.

(21) Appl. No.: 14/673,936

(22) Filed: Mar. 31, 2015

(65) Prior Publication Data

US 2015/0274968 A1    Oct. 1, 2015

(30) Foreign Application Priority Data

Mar. 31, 2014 (EP) .................................... 14162674

(51) Int. Cl.
  *C08L 77/06* (2006.01)
  *C08K 5/00* (2006.01)

(52) U.S. Cl.
  CPC ............... *C08L 77/06* (2013.01); *C08K 5/00* (2013.01)

(58) Field of Classification Search
  None
  See application file for complete search history.

(56) References Cited

U.S. PATENT DOCUMENTS

| 2002/0019477 | A1* | 2/2002 | Bartz | ...................... C08L 77/00 524/514 |
| 2008/0269375 | A1 | 10/2008 | Park et al. | |
| 2008/0274355 | A1* | 11/2008 | Hewel | ................. C08G 69/265 428/402 |
| 2009/0012229 | A1* | 1/2009 | Desbois | .............. C08G 69/265 524/538 |
| 2013/0338260 | A1 | 12/2013 | Center et al. | |
| 2016/0297120 | A1* | 10/2016 | Lamberts | ............ C08G 69/265 |

FOREIGN PATENT DOCUMENTS

| DE | 198 41 234 C1 | 11/1999 |
| DE | 100 30 716 A1 | 1/2002 |
| EP | 0 350 689 A2 | 1/1990 |
| EP | 0 368 281 A1 | 5/1990 |
| EP | 1 170 334 A2 | 1/2002 |
| EP | 2 325 260 A1 | 5/2011 |
| WO | 00/24830 A1 | 5/2000 |
| WO | 00/73375 A2 | 12/2000 |
| WO | 2004/092274 A1 | 10/2004 |
| WO | 2007/101809 A2 | 9/2007 |

OTHER PUBLICATIONS

Search Report of corresponding European Patent Application No. 14 16 2674 dated Sep. 5, 2014.

* cited by examiner

*Primary Examiner* — Michael J Feely
(74) *Attorney, Agent, or Firm* — Sughrue Mion, PLLC

(57) ABSTRACT

A polyamide molding composition and uses thereof, and moldings produced therefrom, comprising the following components:
(A) semicrystalline semiaromatic polyamide with melting point above 270° C., or a mixture of these polyamides;
(B) copolymer of oxyranyl acrylate and/or oxyranyl methacrylate with at least one other olefinically unsaturated monomer, or a mixture of these copolymers;
(C) one or more fibrous reinforcing materials;
(D) one or more heat stabilizers;
where the proportion of (B) is in the range of 1 to 15% by weight, based on 100% by weight composed of the entirety of the components (A) and (B),
with the proviso that the polyamide molding composition is free from grafted impact modifiers.

38 Claims, No Drawings

POLYAMIDE MOULDING COMPOSITIONS, PROCESS FOR PRODUCTION THEREOF AND USE OF THESE POLYAMIDE MOULDING COMPOSITIONS

TECHNICAL FIELD

The present invention relates to polyamide moulding compositions, processes for production thereof and uses of these polyamide moulding compositions.

PRIOR ART

Semicrystalline, semiaromatic polyamides or copolyamides have been developed for use in high-temperature applications and, in particular when content of semialiphatic terephthalamide units is at least 50 mol %, feature particularly good thermo-mechanical properties. The melting point of polyamides of this type is typically in the range from 270 to 340° C. Moulding compositions based on these polyamides sometimes exhibit weaknesses determined by their composition, in particular in respect of toughness, i.e. tensile strain at break, fracture energy, impact resistance and notched impact resistance. Furthermore, particularly in the case of fibre-reinforced moulding compositions, mechanical properties measured perpendicularly to the direction of processing are rather poor and markedly poorer than in the direction of processing. Although it is mostly possible to achieve a slight increase of impact resistance or fracture energy in the longitudinal direction by using conventional impact modifiers, i.e. styrene copolymers, polyolefins or polyolefin-co-acrylates, including those grafted with, for example, maleic anhydride for reasons of compatibility, there is a simultaneous marked reduction of ultimate tensile strength. This type of addition of impact modifiers does not improve mechanical properties perpendicularly to the direction of processing, but instead generally again has an adverse effect on these.

WO-A-2000/73375 describes halogen-free flame-retardant additions for polycondensates comprising a polyolefin with from 0.1 to 30% by weight of a monomer bearing acid, anhydride or epoxy groups. Addition of the polyolefin to the polycondensates not only reduces the after flame time in the fire test but also retains almost the same level of mechanical properties. This means that the addition of modified polyolefins does not lead to improvement of the mechanical properties of the polycondensates. Modified polyolefins having epoxy groups are proposed for polyesters, and polyethylene-co-α-olefins having maleic anhydride groups are proposed for polyamides.

DE-A-100 30 716 describes polyamide moulding compositions comprising aliphatic polyamides having an excess of terminal amino groups and a mixture of two impact modifiers (IM), where the first IM component is a polyolefin or SEBS having anhydride groups and the second IM component is a copolymer composed of the following monomers: (1) α-olefin, (2) (meth)acrylic acid, (meth)acrylate and (3) olefinically unsaturated carboxylic anhydrides, carboximides, epoxides, oxazolines or oxazinones. The unreinforced formulations feature in particular high low-temperature impact resistance of the type required for petrol lines in the automobile sector. The relationships between impact modifiers and the resultant mechanical properties found for the aliphatic polyamides are not applicable to high-melting-point, fibre-reinforced semiaromatic polyamide moulding compositions.

EP-A-0 350 689 relates to polyamide moulding compositions based on semiaromatic polyamides using red phosphorus as flame retardant. The moulding compositions can optionally be reinforced with glass fibres, and optionally comprise up to 40% by weight of impact-modifying polymers (IM). Within an extensive list comprising very many impact modifiers that can be used, mention is made inter alia of copolymers comprising glycidyl (meth)acrylate. The examples use no impact modifier at all, and nor is there any description of any possible effect that could derive from the addition of IM in that context. WO-A-2000/24830 describes moulding compositions comprising semiaromatic polyamides and impact modifiers for the production of electrical connectors in the automobile sector. Low surface roughness, high dimensional stability, and also the high temperature resistance values conventional for polyphthalamides, are mentioned alongside good mouldability. Polyolefins modified via grafting with carboxylic acids or carboxylic anhydrides are described as impact modifiers. The examples do not use fibre-reinforced moulding compositions.

WO-A-2004/092274 relates to impact-modified polyphthalamides for blow moulding, with the resultant possibility of a low level of glass-fibre reinforcement of the moulding compositions. A wide variety of polymers can be used as impact modifiers, examples being polyolefins, polystyrene-polyolefin block copolymers, and polyolefin-acrylate copolymers respectively modified via grafting with olefinically unsaturated monomers. The moulding compositions are intended to exhibit a low sag ratio during the production of the parison.

DE 198 41 234 C1 relates to a reversible thermotropic plastics moulding composition made of two components that are thermodynamically not miscible with one another, where the first component consists of transparent plastic. The second component can inter alia be an ethylene-co-glycidyl methacrylate copolymer (EGMA). Unreinforced mixtures of amorphous polyamide PA MACM12 and an EGMA copolymer are used, and as concentration of the second component increases notched impact resistance increases and transparency decreases. The transparency of those moulding compositions moreover changes as a function of temperature.

US2013338260 discloses a mixed-in-the-melt thermoplastic composition which comprises a) a semicrystalline polyamide resin, b) a polyepoxy compound having at least two or more epoxy groups, where the average molecular weight of the said compound is less than 8000, and also one or more carboxylic acid compounds selected from the group consisting of: polyacids, acid alcohols and combinations of these compounds, where the average molecular weight of the carboxylic acid compounds is less than 2000, and also optionally moreover d) reinforcing materials, e) polymeric hardeners and f) other additives. Systems such as nylon-6, 6/6,T with melting point below 270° C. are used in the context of Comparative Examples together with an ethylene/butyl acrylate/glycidyl methacrylate copolymer in a small proportion by weight of 1%.

EP 2 325 260 discloses a polyamide moulding composition with the following constitution: a) from 40 to 90% by weight of a copolyamide composed of (a1) 1,6-hexanediamine and 1,10-decanediamine and (a2) terephthalic acid and at least one other polyamide-forming monomer selected from the group of: dicarboxylic acid having from 8 to 18 carbon atoms, laurolactam, aminolauric acid and/or mixtures thereof; (b) from 10 to 40% by weight of macromolecular plasticizers, with the proviso that these can to some extent be replaced by low-molecular-weight plasticizers; (c)

from 0 to 20% by weight of additives and/or additional substances. Uses of this type of moulding composition are moreover described, in particular for the production of a fuel line, coolant line, oil line or urea line for the automobile sector, as also are production processes to give mouldings.

EP 0 368 281 discloses a polyamide resin composition which comprises the following components: (A) an aromatic polyamide resin comprising (a) an aromatic dicarboxylic acid component, (b) a diamine component comprising at least one aliphatic diamine component or alicyclic diamine component; (b) an olefin copolymer in quantities of from 0.5 to 50 parts by weight, based on 100 parts by weight of the aromatic polyamide resin, which comprises an α-olefin component and an α,β-unsaturated glycidyl carboxylate component in quantities of from 1 to 30%, based on the copolymer. The polyamide resin composition can moreover comprise quantities of from 10 to 200 parts by weight of a polyarylate, based on 100 parts by weight of the polyamide resins, where the polyarylate is a polymerization product of bisphenols and aromatic dicarboxylic acids or their derivatives.

DESCRIPTION OF THE INVENTION

The invention is based inter alia on the object of providing an improved moulding composition, based on high-melting point, in particular semicrystalline and semiaromatic polyamides, which has not only high HDT A (1.80 MPa) heat deflection temperature preferably in the region of at least 240° C. and/or HDT C (8 MPa) preferably in the region of at least 130° C. but also high ultimate tensile strength and tensile strain at break, and also improved mechanical properties, i.e. high ultimate tensile strength, tensile strain at break and fracture energy perpendicularly to the direction of processing. The intention is that the heat deflection temperature of a moulding composition reinforced with 40% by weight of glass fibres be: HDT A preferably at least 250° C. and/or HDT C preferably at least 140° C. The said object is achieved by providing a polyamide moulding composition comprising the following constituents:

(A) semicrystalline, semiaromatic polyamide with melting point above 270° C., or a mixture of these polyamides;
(B) copolymer of oxiranyl acrylate and/or oxiranyl methacrylate, preferably in the form of glycidyl acrylate and/or glycidyl methacrylate, with at least one other olefinically unsaturated monomer, or a mixture of these copolymers;
(C) one or more fibrous reinforcing materials;
(D) one or more heat stabilizers.

The proportion of (B) here is in the range from 1 to 15% by weight, based on 100% by weight of the entirety of components (A) and (B).

Modified, i.e. grafted impact modifiers are moreover excluded as constituent of the polyamide moulding composition. In the context of the impact modifiers excluded from the polyamide moulding composition for the purposes of the present invention the term "grafted" means that the modifier of a polymer (impact modifier) has been produced via a graft reaction with preferably low-molecular-weight, unsaturated compounds, for example maleic anhydride, i.e. via grafting, and that reactive functional groups are introduced into the polymer via the graft reaction. Accordingly, grafted impact modifiers are those polymers equipped with reactive functional groups where the functional groups have been produced via, by way of example, free-radical grafting of, for example, styrene copolymers, polyolefins or polyolefin copolymers with unsaturated compounds. The expression "unsaturated compounds" here means by way of example unsaturated carboxylic acids, e.g. itaconic acid, or unsaturated carboxylic anhydrides, e.g. maleic anhydride. Examples of excluded compounds are therefore in particular polyolefins or polyolefin copolymers modified in this way.

The use of these grafted polyolefins or grafted polyolefin copolymers is excluded according to the present invention because presence of these does not improve mechanical properties in particular perpendicularly to the direction of processing, but instead, on the contrary, generally impairs the same.

None of the prior-art documents listed above describes a polyamide moulding composition with the claimed constitution. Nor is there any indication as to how mechanical properties perpendicularly to the direction of processing of fibre-reinforced semiaromatic polyamide moulding compositions with high melting point could be improved or that those polyamide moulding compositions could be particularly suitable for the field of mouldings which must withstand high load perpendicularly to the direction of the fibres, because the mouldings by way of example comprise fillets or are hollow bodies subjected to internal pressure, or have exposure to high impact loadings. In particular, the documents of the prior art cannot lead the person skilled in the art to suppose that a moulding composition of that type is capable of achieving the excellent longitudinal and transverse properties required for such applications, together with high heat deflection temperature and high impact resistance and notched impact resistance.

A substantial element of the invention therefore consists inter alia in the discovery that, unexpectedly, the specific composition proposed actually can have not only high heat deflection temperature but also firstly high ultimate tensile strength and tensile strain at break in the longitudinal direction and secondly mechanical properties perpendicularly to the direction of processing that are markedly improved in comparison with the prior art, in particular ultimate tensile strength, tensile strain at break and fracture energy, and retains good processability at the stated levels of reinforcement (proportion of the component (C)).

According to a first preferred embodiment, the polyamide moulding composition is constituted to comprise the following proportions of the following components:
(M) from 32 to 84.9% by weight of a mixture consisting of (A) and (B) in the following proportions:
(A) from 85 to 99% by weight of semicrystalline, semiaromatic polyamide with melting point above 270° C., or a mixture of these polyamides;
(B) from 1 to 15% by weight of copolymer of glycidyl acrylate and/or glycidyl methacrylate with at least one other monomer having at least one olefinic carbon-carbon double bond, or a mixture of these copolymers;
where the entirety of A and B gives 100% of the component (M);
(C) from 15 to 65% by weight of fibrous reinforcing materials;
(D) from 0.1 to 3.0% by weight of heat stabilizers;
(E) from 0 to 25% by weight of auxiliaries and/or additives different from components (C) and (D), and/or polymers different from (A) and (B).

It is preferable here that the polyamide moulding composition consists of the components mentioned, i.e. the entirety of (M), (C), (D) and (E) gives 100% by weight.

The proportion of (M) is preferably in the range from 35 to 79.8% by weight, with preference being in the range from 40 to 74.75% by weight or from 45 to 69.8% by weight. Within the said component (M) it is preferable that the ratios of the components (A) and (B) are as follows: in each case based on the entirety of (A) and (B) as 100% of the component (M), the proportion of the component (A) present is in the range from 88 to 98% by weight, or in the range from 85 to 97% by weight, preferably in the range from 89 to 97% by weight, with particular preference in the range from 90 to 97% by weight or in the range from 92 to 97% by weight, and/or the proportion of the component (B) present is in the range from 2 to 12% by weight or in the range from 3 to 15% by weight, preferably in the range from 3 to 11% by weight, with particular preference in the range from 3 to 10% by weight or from 3 to 8% by weight.

It is preferable that the semicrystalline, semiaromatic polyamides (component A) with melting point above 270° C. used according to the invention are polyphthalamides, in particular polyamides with at least 52 mol % content of terephthalic acid, preferably at least 54 mol % and particularly preferably at least 57 mol %, based in each case on the entirety of dicarboxylic acid present, and with at least 70 mol % content of aliphatic diamines having from 4 to 18 C atoms, preferably from 6 to 12 C atoms, preferably at least 80 mol % and with particular preference 100 mol %, based on the entirety of the diamines present. The content of terephthalic acid is preferably in the range from 52 to 100 mol %, particularly preferably in the range from 54 to 82 mol % or from 57 to 74 mol %, based on the entirety of the dicarboxylic acids present.

Other aromatic, aliphatic or cycloaliphatic dicarboxylic acids having from 6 to 36 carbon atoms can be used, besides the terephthalic acid, in the semiaromatic polyamides of the invention. Among the suitable aromatic dicarboxylic acids are naphthalenedicarboxylic acid (NDA) and isophthalic acid (IPA). Suitable aliphatic dicarboxylic acids are adipic acid, suberic acid, azelaic acid, sebacic acid, undecanedioic acid, dodecanedioic acid, bras sylic acid, tetradecanedioic acid, pentadecanedioic acid, hexadecanedioic acid, octadecanedioic acid and dimer acid having 36 carbon atoms. Suitable cycloaliphatic dicarboxylic acids are cis- and/or trans-cyclohexane-1,4-dicarboxylic acid and/or cis- and/or trans-cyclohexane-1,3-dicarboxylic acid (CHDA).

Suitable aliphatic diamines having from 4 to 18 C atoms, which may be linear or branched, are 1,4-butanediamine, 1,5-pentanediamine, 2-methyl-1,5-pentanediamine (MPMD), 1,6-hexanediamine, 1,7-heptanediamine, 1,8-octanediamine (OMDA), 1,9-nonanediamine (NMDA), 2-methyl-1,8-octanediamine (MODA), 2,2,4-trimethylhexamethylenediamine (TMHMD), 2,4,4-trimethylhexamethylenediamine (TMHMD), 5-methyl-1,9-nonanediamine, 1,10-decanediamine, 1,11-undecanediamine, 2-butyl-2-ethyl-1,5-pentanediamine, 1,12-dodecanediamine, and also 1,13-tridecanediamine, 1,14-tetradecanediamine, 1,16-hexadecanediamine, and 1,18-octadecanediamine, and mixtures thereof.

The polyamides (A) can also comprise, besides the aliphatic diamines having from 4 to 12 carbon atoms, a subordinate quantity of preferably no more than 30 mol % (based on the entire quantity of the diamines), particularly preferably no more than 20 mol %, of cycloaliphatic diamines, for example 1,4-cyclohexanediamine, 1,3-bis(aminomethyl)-cyclohexane (BAC), is ophoronediamine, norbornanedimethylamine, 4,4'-diamino-dicyclohexylmethane (PACM), 2-(4,4'-diaminodicyclohexyl)propane (PACP) and 3,3'-dimethyl-4,4'-bis(aminodicyclohexyl)methane (MACM), and also araliphatic diamines, e.g. para- and meta-xylylenediamine (MXDA).

It is preferable that component A comprises no more than 30 mol % (based on the entirety of the monomers) of the optionally additionally present lactams and amino acids. Examples of suitable compounds are caprolactam (CL), α,ω-aminocaproic acid, α,ω-aminononanoic acid, α,ω-aminoundecanoic acid (AUA), laurolactam (LL) and ω-aminododecanoic acid (ADA).

Preferred representatives of component (A) are the following polyamides: 6T/MPMDT, 6T/MPMDT/6I, 6T/6I/66, PA 4T/4I, PA 4T/6I, PA 5T/5I, PA 6T/6, PA 6T/6I, PA 6T/6I/6, PA 6T/66, 6T/610, 6T/612, PA 6T/10I, PA 6T/10I, PA 9T, PA 10T, PA 12T, PA 10T/10I, PA10T/106, PA10T/12, PA10T/11, PA 6T/9T, PA 6T/12T, PA 6T/10T/6I, PA 6T/6I/6, PA 6T/6I/12, and also mixtures thereof. In particular it is preferable that the semiaromatic polyamide of the component (A) is selected from the following group: PA 6T/6I, 6T/MPMDT, PA 6T/10T, PA 6T/10T/6I, and also mixtures thereof.

Preference is therefore in particular given according to the invention to the following semiaromatic copolyamides as high-melting-point polyamides of component (A):

semicrystalline nylon-6,T/6,I having from 55 to 75 mol % of hexamethyleneterephthalamide units and from 25 to 45 mol % of hexamethyleneisophthalamide units;

semicrystalline nylon-6,T/6,I having from 62 to 73 mol % of hexamethyleneterephthalamide units and from 25 to 38 mol % of hexamethyleneisophthalamide units;

semicrystalline nylon-6,T/6,I having from 68 to 72 mol % of hexamethyleneterephthalamide units and from 28 to 32 mol % of hexamethyleneisophthalamide units;

semicrystalline polyamide produced from at least 52 mol % of terephthalic acid and at most 48 mol % of isophthalic acid, in particular from 100 mol % of terephthalic acid, and from a mixture of at least two diamines selected from the group of hexamethylenediamine, nonanediamine, methyloctanediamine, decanediamine and dodecanediamine;

semicrystalline polyamide produced from 70 to 100 mol % of terephthalic acid and from 0 to 30 mol % of isophthalic acid, and also from a mixture of hexamethylenediamine and dodecanediamine;

semicrystalline polyamide produced from at least 52 mol % of terephthalic acid and at most 48 mol % of decanedioic acid or dodecanedioic acid, and also from at least one diamine selected from the group of hexamethylenediamine, nonanediamine, methyloctanediamine, decanediamine, and dodecanediamine;

semicrystalline nylon-6,T/10,T having from 10 to 60 mol %, preferably from 10 to 40 mol %, of hexamethyleneterephthalamide (6,T) units and from 40 to 90 mol %, preferably from 60 to 90 mol %, of decamethyleneterephthalamide (10,T) units;

semicrystalline nylon-6,T/10,T/6,I having from 52 to 90 mol %, preferably from 52 to 72 mol %, of hexamethyleneterephthalamide (6,T) units and from 5 to 43 mol %, preferably from 10 to 30 mol %, of hexamethyleneisophthalamide (6,I) units and from 5 to 43 mol %, preferably from 18 to 38 mol %, of decamethyleneterephthalamide (10,T) units;

semicrystalline nylon-6,T/6,I/6 having from 60 to 85 mol % of hexamethyleneterephthalamide (6,T) units and from 15 to 40 mol % of hexamethyleneisophthalamide (6,I) units, which also comprises from 5 to 15% by weight of caprolactam.

It is preferable that the component (A) is a semiaromatic polyamide PA6T/6I with from 62 to 82 mol % terephthalic acid content, or from 66 to 78 mol %, very preferably particularly from 68 to 74% by weight, based on the entirety of the dicarboxylic acids used, and with melting point in the range from 270 to 340° C., in particular in the range from 280 to 325° C. It is moreover preferable that component A has terminal amino group concentration in the range from 20 to 250 mmol/kg, preferably from 30 to 150 mmol/kg and particularly preferably in the range from 35 to 150 mmol/kg, and/or terminal carboxy group concentration in the range from 20 to 250 mmol/kg, preferably from 20 to 200 mmol/kg and particularly preferably in the range from 35 to 150 mmol/kg, and/or blocked terminal group concentration in the range from 10 to 150 mmol/kg, preferably from 20 to 90 mmol/kg and particularly preferably in the range from 25 to 80 mmol/kg, where in particular terminal amino groups are blocked by monofunctional carboxylic acids, preferably by aromatic monocarboxylic acids, and/or phosphorus content in the range from 40 to 100 ppm, preferably from 50 to 90 ppm and in particular in the range from 60 to 85 ppm.

In relation to the polyamide PA 6T/6I (component A) it is preferable that the magnitude of the difference between the content of terminal amino groups and the content of carboxy groups is at most 140 mmol/kg, in particular at most 120 mmol/kg, where the entirety of the terminal amino and terminal carboxy groups is preferably at least 180 mmol/kg, particularly preferably at least 200 mmol/kg.

The entirety of all of the terminal groups of polyamide A, i.e. the entirety of the terminal amino, terminal carboxy and blocked terminal groups, is moreover preferably in the range from 200 to 300 mmol/kg, in particular in the range from 220 to 280 mmol/kg. From 20 to 80%, preferably from 30 to 60% and particularly preferably from 35 to 55%, of the terminal amino groups in polyamide A take the form of blocked terminal groups, where the terminal amino groups are preferably blocked by monocarboxylic acids, in particular by aromatic monocarboxylic acids.

In respect of the properties of the moulding compositions, and also processing of the same, it has proved to be advantageous for the solution viscosity ($\eta_{rel}$) of the polyamide (A) to be from 1.4 to 1.8, with particular preference from 1.45 to 1.7, and/or for the glass transition temperature $T_g$ of the polyamide (A) to be above 100° C., preferably above 110° C., with particular preference above 120° C. It has likewise proved to be advantageous for the melting point of the semicrystalline polyamide (A) to be in the range from 270 to 340° C., in particular in the range from 280 to 330° C., and for the enthalpy of fusion thereof to be in the range from 30 to 70 J/g, in particular in the range from 40 to 65 J/g.

It is generally preferable that component (A) is a semi-aromatic polyamide based on terephthalic acid with at least 52 mol %, preferably at least 54 mol % and with particular preference at least 57 mol %, content of terephthalic acid, preferably in combination with isophthalic acid as further diacid in a proportion of at least 18 mol %, preferably of at least 26 mol %, based in each case on the entirety of the dicarboxylic acid used and based on one or more linear aliphatic diamines with chain length in the range from 4 to 18 carbon atoms, preferably in the range from 6 to 12 carbon atoms, with particular preference selected from 1,6-hexamethylenediamine and/or 1,10-decanediamine, where with particular preference the component (A) is selected as 6T/6I with from 62 to 82 mol % content of terephthalic acid, based on the entirety of the dicarboxylic acid used.

Component (B) is polymers bearing epoxy groups in the pendant chain. Preference is given to copolymers composed of monomers containing epoxy groups and of at least one other monomer, where both groups of monomers comprise at least one polymerizable carbon-carbon double bond. It is preferable that the concentration of (B) is in the range from 2 to 12% by weight, in particular in the range from 3 to 11% by weight or from 3 to 10% by weight, based on the entirety of the components (A) and (B). Below 1% by weight the effect of component (B) is slight, and the advantages of component (B) have little effect in the moulding compositions; above 15% by weight there is a sharp decrease of stiffness and the moulding composition is no longer adequately processable because of excessive melt viscosity (excessively low MVR values). Terpolymers can also be involved here.

Preferred monomers containing epoxy groups are glycidyl acrylate and glycidyl methacrylate. The other monomers having C—C double bond are preferably selected from alkenes (acyclic alkenes, cycloalkenes, polyenes), acrylic monomers and vinyl monomers, particular preference being given here to acyclic alkenes having 2 to 10 carbon atoms, acrylic esters and vinyl acetate.

It is therefore preferable to use, as component (B), copolymers of glycidyl acrylate and/or glycidyl methacrylate and of at least one other unsaturated monomer which comprises at least one non-aromatic carbon-carbon double bond, i.e. an olefinically unsaturated monomer. It is preferable that component (B) is a copolymer of glycidyl acrylate and/or glycidyl methacrylate and of at least one other olefinically unsaturated monomer, where the concentration of glycidyl acrylate and glycidyl methacrylate is in the range from 5 to 15% by weight, preferably in the range from 6 to 14% by weight and particularly preferably in the range from 7 to 13% by weight, based on the copolymer. If the copolymer comprises less than 5% by weight of glycidyl acrylate or glycidyl methacrylate, the reactivity of component B is inadequate and the desired mechanical properties are not obtained. If the concentration of glycidyl acrylate or of glycidyl methacrylate in component B exceeds 15% by weight, increasing deterioration of processability, surface quality and mechanical properties occurs.

It is moreover preferable that the other olefinically unsaturated monomer is a monounsaturated olefin, preferably an α-olefin, having from 2 to 8 carbon atoms, or a (meth)acrylic ester or a vinyl monomer. In particular the copolymer (B) comprises, alongside glycidyl acrylate and/or glycidyl methacrylate, at least one other olefinically unsaturated monomer selected from the group consisting of: ethene, propene, 1-butene, 2-butene, 1-pentene, 2-pentene, methyl (meth)acrylate, ethyl (meth)acrylate, propyl (meth)acrylate, isopropyl (meth)acrylate, butyl (meth)acrylate, acrylamide, acrylonitrile and vinyl acetate. It is particularly preferable that component (B) is a copolymer of glycidyl methacrylate and ethene, and also optionally of other olefinically unsaturated monomers, where the content of ethene is in the range from 50 to 95% by weight, preferably in the range from 65 to 93% by weight and particularly preferably in the range from 80 to 95% by weight or from 85 to 94% by weight.

Specific examples are copolymers of ethylene and glycidyl acrylate; ethylene and glycidyl methacrylate; ethylene, methyl methacrylate and glycidyl methacrylate; ethylene, methyl acrylate and glycidyl methacrylate; ethylene, ethyl acrylate and glycidyl methacrylate; ethylene, butyl acrylate and glycidyl methacrylate; ethylene, vinyl acetate and glycidyl methacrylate.

Particular preference is given to copolymers
of ethylene and glycidyl methacrylate with from 7 to 14% by weight content of glycidyl methacrylate, based on the entirety of all of the monomers in the copolymer;
of from 71 to 88% by weight of ethylene, from 5 to 15% by weight of vinyl acetate and from 7 to 14% by weight of glycidyl methacrylate, based on the entirety of all of the monomers in the copolymer;
of from 56 to 73% by weight of ethylene, from 20 to 30% by weight of methyl acrylate and from 7 to 14% by weight of glycidyl methacrylate, based on the entirety of all of the monomers in the copolymer;
from 51 to 78% by weight of ethylene, from 15 to 35% by weight of butyl acrylate and from 7 to 14% by weight of glycidyl methacrylate, based on the entirety of all of the monomers in the copolymer.

Component (B) is therefore generally preferably a copolymer of glycidyl acrylate and/or glycidyl methacrylate and of at least one other unsaturated monomer having at least one carbon-carbon double bond, where the concentration of glycidyl acrylate, glycidyl methacrylate or the mixture thereof is preferably in the range from 5 to 15% by weight, with preference in the range from 7 to 14% by weight, based on the entirety of all of the monomers in the copolymer. The other unsaturated monomer here can be a monounsaturated olefin, preferably an α-olefin, having from 2 to 8 carbon atoms and/or a (meth)acrylic ester having from 4 to 12 carbon atoms and/or vinyl acetate.

It is preferable that the copolymer (B) comprises, alongside glycidyl acrylate and/or glycidyl methacrylate, at least one other unsaturated monomer selected from the group consisting of: ethene, propene, 1-butene, 2-butene, 1-pentene, 2-pentene, methyl (meth)acrylate, ethyl (meth)acrylate, propyl (meth)acrylate, isopropyl (meth)acrylate, butyl (meth)acrylate, vinyl acetate and combinations thereof.

According to one very preferred embodiment, compound (B) is a copolymer of glycidyl methacrylate and ethene, and also optionally of other olefinically unsaturated monomers, where the content of ethene is in the range from 50 to 95% by weight, preferably in the range from 65 to 93% by weight.

It is preferable that the melt flow rate (MFR) of component (B), determined in accordance with ISO 1133 at 190° C. with an applied weight of 2.16 kg is in the range from 2 to 20 g/10 min, preferably in the range from 3 to 15 g/10 min.

Particularly preferred examples of components (B) that can be used according to the invention are the systems obtainable from Arkema with the product name Lotader AX, in particular AX8840 (copolymer of 92% of ethene and 8% of glycidyl methacrylate) or AX8900 (copolymer of 67% of ethene, 25% of methyl acrylate and 8% of glycidyl methacrylate). Preference is likewise given to Elvaloy products from DuPont, in particular Elvaloy PTW (copolymer of 67% of ethene, 28% of butyl acrylate and 5% of glycidyl methacrylate), and also to Igetabond products obtainable from Sumitomo, in particular Igetabond E (copolymer of 88% of ethene and 12% of glycidyl methacrylate).

The moulding compositions moreover comprise fibrous reinforcing materials, preferably at a concentration of from 15 to 65% by weight (component (C)), in the form of fibres, for example glass fibres or carbon fibres. It is preferable that the moulding compositions comprise from 20 to 60% by weight of fibrous reinforcing materials, in particular from 25 to 55% by weight or from 30 to 45% by weight.

It is preferable that component (C) used takes the form of glass fibres, e.g. in the form of what are known as short fibres (e.g. chopped glass of length from 0.2 to 20 mm) or continuous-filament fibres (rovings). The glass fibres can have various cross sections, preference being given here to glass fibres with circular cross section (round fibres) or with non-circular cross section (flat fibres).

A feature of one preferred embodiment of the polyamide moulding composition according to the invention is that component (C) consists exclusively of glass fibres, the proportion of which present is in the range from 20 to 60% by weight, preferably in the range from 25 to 55% by weight or from 25 to 45% by weight, based on the moulding composition.

The diameter of glass fibres with circular cross section, i.e. round glass fibres, is in the range from 3 to 20 µm, preferably in the range from 5 to 13 µm and particularly preferably in the range from 5 to 10 µm. They are preferably used in the form of short glass fibre (chopped glass of length from 0.2 to 20 mm, preferably from 2 to 12 mm).

In the case of the flat glass fibres, i.e. glass fibres with non-circular cross section, it is preferable to use those where the dimensional ratio of the primary cross-sectional axis to the secondary cross-sectional axis perpendicular thereto is more than 2.5, preferably in the range from 2.5 to 6, in particular in the range from 3 to 5. The cross section of these ("flat") glass fibres is oval, elliptical, elliptical with constricted area(s) ("cocoon" fibre), polygonal, rectangular or almost rectangular. Another characterizing feature of the flat glass fibres used is that the length of the primary cross-sectional axis is preferably in the range from 5 to 35 µm, in particular in the range from 12 to 30 µm, and the length of the secondary cross-sectional axis is preferably in the range from 3 to 17 µm, in particular in the range from 4 to 10 µm. The flat glass fibres here have the highest possible packing density, i.e. the extent to which the cross section of the glass fills an imaginary rectangle that encloses the glass fibre cross section with the greatest possible precision is at least 70%, preferably at least 80%, and with particular preference at least 85%.

The moulding compositions of the invention can also be reinforced by using mixtures of glass fibres with circular and non-circular cross section, where the proportion of flat glass fibres is preferably predominant, i.e. makes up more than 50% by weight of the entirety of the fibres.

It is preferable that component (C) is selected from the group consisting of: E glass fibres (in accordance with ASTM D578-00 these consist of from 52 to 62% of silicon dioxide, from 12 to 16% of aluminium oxide, from 16 to 25% of calcium oxide, from 0 to 10% of borax, from 0 to 5% of magnesium oxide, from 0 to 2% of alkali metal oxides, from 0 to 1.5% of titanium dioxide and from 0 to 0.3% of iron oxide; their properties are preferably density 2.58±0.04 g/cm$^3$, tensile modulus of elasticity from 70 to 75 GPa, tensile strength from 3000 to 3500 MPa and tensile strain at break from 4.5 to 4.8%), A glass fibres (from 63 to 72% of silicon dioxide, from 6 to 10% of calcium oxide, from 14 to 16% of sodium oxide and potassium oxide, from 0 to 6% of aluminium oxide, from 0 to 6% of boron oxide, from 0 to 4% of magnesium oxide), C glass fibres (from 64 to 68% of silicon dioxide, from 11 to 15% of calcium oxide, from 7 to 10% of sodium oxide and potassium oxide, from 3 to 5% of aluminium oxide, from 4 to 6% of boron oxide, from 2 to 4% of magnesium oxide), D glass fibres (from 72 to 75% of silicon dioxide, from 0 to 1% of calcium oxide, from 0 to 4% of sodium oxide and potassium oxide, from 0 to 1% of aluminium oxide, from 21 to 24% of boron oxide), basalt fibres (mineral fibre with the approximate composition: 52% of $SiO_2$, 17% of $Al_2O_3$, 9% of CaO, 5% of MgO, 5% of Na₂O, 5% of iron oxide, and also other metal oxides), AR glass fibres (from 55 to 75% of silicon dioxide, from 1 to 10% of calcium oxide, from 11 to 21% of sodium oxide and potassium oxide, from 0 to 5% of aluminium oxide, from 0 to 8% of boron oxide, from 0 to 12% of titanium dioxide, from 1 to 18% of zirconium oxide, from 0 to 5% of iron oxide), and mixtures thereof.

A preferred embodiment of the component (C) is provided by high-strength glass fibres based on the ternary system silicon dioxide-aluminium oxide-magnesium oxide or on the quaternary system silicon dioxide-aluminium oxide-magnesium oxide-calcium oxide, where the sum of the contents of silicon dioxide, aluminium oxide and magnesium oxide is at least 78% by weight, preferably at least 87% by weight and particularly preferably at least 92% by weight, based on the entire composition of the glass.

It is specifically preferable to use a composition of from 58 to 70% by weight of silicon dioxide ($SiO_2$), from 15 to 30% by weight of aluminium oxide ($Al_2O_3$), from 5 to 15% by weight of magnesium oxide (MgO), from 0 to 10% by weight of calcium oxide (CaO) and from 0 to 2% by weight of other oxides, e.g. zirconium dioxide ($ZrO_2$), boron oxide ($B_2O_3$), titanium dioxide ($TiO_2$) or lithium oxide ($Li_2O$). In another embodiment the composition of the high-strength glass fibre is from 60 to 67% by weight of silicon dioxide ($SiO_2$), from 20 to 28% by weight of aluminium oxide ($Al_2O_3$), from 7 to 12% by weight of magnesium oxide (MgO), from 0 to 9% by weight of calcium oxide (CaO) and from 0 to 1.5% by weight of other oxides, e.g. zirconium dioxide ($ZrO_2$), boron oxide ($B_2O_3$), titanium dioxide ($TiO_2$), lithium oxide ($Li_2O$).

In particular it is preferable that the composition of the high-strength glass fibre is as follows: from 62 to 66% by weight of silicon dioxide ($SiO_2$), from 22 to 27% by weight of aluminium oxide ($Al_2O_3$), from 8 to 12% by weight of magnesium oxide (MgO), from 0 to 5% by weight of calcium oxide (CaO), from 0 to 1% by weight of other oxides, e.g. zirconium dioxide ($ZrO_2$), boron oxide ($B_2O_3$), titanium dioxide ($TiO_2$), lithium oxide ($Li_2O$).

The properties of the high-strength glass fibre are preferably tensile strength greater than or equal to 3700 MPa, preferably at least 3800 or 4000 MPa, tensile strain at break at least 4.8%, preferably at least 4.9 or 5.0%, and tensile modulus of elasticity greater than 75 GPa, preferably more than 78 or 80 GPa, where these properties of the glass are to be determined on individual fibres (pristine single filament) of diameter 10 μm and length 12.7 mm at a temperature of 23° C. and relative humidity 50%. Specific examples of these high-strength glass fibres of component (C) are S glass fibres from Owens Corning with 995 size, T glass fibres from Nittobo, HiPertex from 3B, HS4 glass fibres from Sinoma Jinjing Fiberglass, R glass fibres from Vetrotex, and also S-1 and S-2 glass fibres from AGY.

The glass fibres used according to the invention by way of example as roving (continuous-filament fibres) have a diameter (in the case of round glass fibres) or a secondary cross-sectional axis (in the case of flat glass fibres) of from 8 to 20, preferably from 12 to 18 μm, where the cross section of the glass fibres can be round, oval, elliptical, elliptical with constricted area(s), polygonal, rectangular or almost rectangular. Particular preference is given to what are known as flat glass fibres where the ratio of the cross-sectional axes, i.e. the ratio of primary cross-sectional axis to secondary cross-sectional axis, is from 2.5 to 5. The continuous-filament fibres can have been produced from the types of glass described above, preference being given here to continuous-filament fibres based on E glass and on the high-strength types of glass. These continuous-filament fibres are incorporated into the polyamide moulding compositions of the invention by known processes for the production of elongate long-fibre-reinforced pellets, in particular by pultrusion processes in which the continuous-filament fibre strand (roving) is completely saturated by the polymer melt and then cooled and chopped. The elongate long-fibre-reinforced pellets thus obtained, preferably with pellet length of from 3 to 25 mm, in particular from 4 to 12 mm, can be further processed by the usual processing methods (e.g. injection moulding, compression) to give mouldings.

Preference is given, as component (C), to glass fibres made of E glass with non-circular cross section (flat fibres) and with a ratio of primary cross-sectional axis to secondary cross-sectional axis of at least 2.5, and/or high-strength glass fibres with circular or non-circular cross section where the composition of the glass is in essence based on the components silicon dioxide, aluminium oxide and magnesium oxide, where the proportion of magnesium oxide (MgO) is from 5 to 15% by weight and the proportion of calcium oxide is from 0 to 10% by weight.

The properties of the glass fibres of the component (C) in the form of flat E glass fibres are preferably density from 2.54 to 2.62 g/cm³, tensile modulus of elasticity from 7/ to 75 GPa, tensile strength from 3000 to 3500 MPa and tensile strain at break from 4.5 to 4.8%, where the mechanical properties were determined on individual fibres of diameter 10 μm and length 12.7 mm at 23° C. with relative humidity 50%.

The glass fibres of the invention can have been provided with a size which comprises a coupling agent based on an amino- or epoxysilane compound and that is suitable for thermoplastics, in particular for polyamide.

Generally, therefore, according to another preferred embodiment of the invention the component (C), the proportion of which present in the moulding composition is preferably in the range from 20 to 60% by weight, with particular preference in the range from 25 to 55% by weight, is glass fibres, carbon fibres, or a mixture of these fibres, preferably glass fibres, with particular preference glass fibres with circular cross section, glass fibres with non-circular cross section, or a mixture of these glass fibres, and it is in particular preferable here that the diameter of glass fibres with circular cross section is in the range from 3 to 12 μm, preferably in the range from 5 to 13 μm and with particular preference in the range from 5 to 12 μm, and that the dimensional ratio of the primary cross-sectional axis to the secondary cross-sectional axis perpendicular thereto in glass fibres with non-circular cross section is more than 2.5, preferably in the range from 2.5 to 6 or from 3 to 5, where the length of the primary cross-sectional axis is preferably in the range from 5 to 35 μm, with preference in the range from 12 to 30 μm, and the length of the secondary cross-sectional axis is preferably in the range from 3 to 17 μm, with preference in the range from 4 to 10 μm.

The thermoplastic moulding compositions of the invention comprise, as component (D), at least one heat stabilizer, preferably at a concentration of from 0.1 to 3% by weight, particularly from 0.15 to 2% by weight or from 0.17 to 1.5% by weight.

In one preferred embodiment the heat stabilizers are selected from the group consisting of
compounds of mono- or divalent copper, e.g. salts of mono- or divalent copper with inorganic or organic acids or with mono- or dihydric phenols, the oxides of mono- or divalent copper, or the complexes of copper salts with ammonia, with amines, with amides, with lactams, with cyanides or with phosphines, preferably Cu(I) or Cu(II) salts of the hydrohalic acids or of the hydrocyanic acids, or the copper salts of the aliphatic carboxylic acids. Particular preference is given to the monovalent copper compounds CuCl, CuBr, CuI, CuCN and $Cu_2O$, and also to the divalent copper compounds $CuCl_2$, $CuSO_4$, CuO, copper(II) acetate or copper(II) stearate. To the extent that a copper compound is used, the quantity of copper is preferably from 0.02 to 0.5% by weight, in particular from 0.03 to 0.35% by weight and particularly preferably from 0.05 to 0.25% by weight, based on the entirety of the components (A) to (E), i.e. based on the moulding composition.

The copper compounds are available commercially, or production thereof is known to the person skilled in the art. The copper compound can be used as it stands or in the form of concentrate. The term concentrate here means a polymer, preferably of the same chemical nature as component (A1) or (A2), which comprises the copper salt at high concentration. The use of concentrates is a conventional method, and is particularly frequently used when very small quantities of a starting material are to be metered. The copper compounds are advantageously used in combination with other metal halides, in particular alkali metal halides, such as NaI, KI, NaBr, KBr, where the molar ratio of metal halide to copper halide is from 0.5 to 20, preferably from 1 to 10 and particularly preferably from 3 to 7.

stabilizers based on secondary aromatic amines, where the quantity of these stabilizers present is preferably from 0.2 to 2% by weight, with preference from 0.2 to 1.5% by weight, stabilizers based on sterically hindered phenols, where the quantity of these stabilizers present is preferably from 0.1 to 1.5% by weight, with preference from 0.2 to 1% by weight, and phosphites and phosphonites, and also mixtures of the abovementioned stabilizers.

Particularly preferred examples of stabilizers that can be used according to the invention, based on secondary aromatic amines, are adducts of phenylenediamine with acetone (Naugard A), adducts of phenylenediamine with linolene, Naugard 445, N,N'-dinaphthyl-p-phenylenediamine, N-phenyl-N'-cyclohexyl-p-phenylenediamine or a mixture of two or more thereof.

Preferred examples of stabilizers that can be used according to the invention based on sterically hindered phenols are N,N'-hexamethylene-bis-3-(3,5-di-tert-butyl-4-hydroxyphenyl)propionamide, glycol bis(3,3-bis(4'-hydroxy-3'-tert-butylphenyl)butanoate, 2,1'-thioethyl bis(3-(3,5-di-tert-butyl-4-hydroxyphenyl)propionate, 4-4'-butylidenebis(3-methyl-6-tert-butylphenol), triethylene glycol 3-(3-tert-butyl-4-hydroxy-5-methylphenyl)propionate and mixtures of two or more of these stabilizers.

Preferred phosphites and phosphonites are triphenyl phosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl) pentaerythritol diphosphite, bis(2,4,6-tris(tert-butyl)phenyl) pentaerythritol diphosphite, tristearyl sorbitol triphosphite, tetrakis(2,4-di-tert-butylphenyl) 4,4'-biphenylene-diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyldibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite. Preference is in particular given to tris[2-tert-butyl-4-thio(2'-methyl-4'-hydroxy-5'-tert-butyl)phenyl-5-methyl]phenyl phosphite and tris(2,4-di-tert-butylphenyl) phosphite.

Preference is in particular given to a heat-stabilization system exclusively based on CuI and KI. It is possible not only to add copper or copper compounds but also to use other transition metal compounds, in particular metal salts or metal oxides of group VB, VIB, VIIB or VIIIB of the Periodic Table of the Elements. It is moreover preferable to add, to the moulding composition of the invention, transition metals of group VB, VIB, VIIB or VIIIB of the Periodic Table of the Elements, e.g. iron powder or steel powder.

Generally, therefore, according to another preferred embodiment the component (D), the proportion of which present in the moulding composition is preferably in the range from 0.2 to 2% by weight, with preference in the range from 0.25 to 1.5% by weight, is a system selected from the following group: compounds of mono- or divalent copper, stabilizers based on secondary aromatic amines, stabilizers based on sterically hindered phenols, phosphites, phosphonites, and mixtures thereof.

Component (E) preferably comprises, as additives and/or auxiliaries different from components (C) and (D) and/or polymers different from (A) and (B), other fillers (E1) different from (C), other polymers (E2) different from (A) and (B), additional substances (E3), and also flame retardants (E4).

There can optionally be, as component (E1), different from the fibrous reinforcing materials of component (B) quantities of from 0 to 25% by weight, based on the moulding composition, of other fillers added to the moulding compositions. The component (E1) can moreover comprise fillers, optionally in surface-treated form, selected from the following group: talc, mica, silicate, quartz, titanium dioxide, wollastonite, kaolin, amorphous silicas, magnesium carbonate, magnesium hydroxide, chalk, lime, feldspar, barium sulphate, solid or hollow glass beads or ground glass, and in particular ground glass fibres, permanently magnetic or magnetizable metal compounds and/or alloys, and also mixtures of the elements of this group. Glass microbeads with average diameter in the range from 5 to 100 μm are particularly preferred as filler, since these give the moulding properties that tend to be isotropic, thus permitting the production of low-warpage mouldings.

The moulding compositions can comprise other polymers (E2) different from (A) and (B), preference being given here to unmodified impact modifiers, aliphatic polyamides, in particular PA6, and amorphous, semiaromatic polyamides, in particular PA 6I/6T.

The moulding compositions can moreover also comprise mixtures of the glycidyl-acrylate- and/or glycidyl-methacrylate-containing copolymers described (component B) with unmodified, i.e. ungrafted impact modifiers (E2), where the ratio of B to E2 is preferably in the range from 5:1 to 1:1.

Preferred unmodified impact modifiers are polyolefins based on α-olefins, in particular ethylene, propylene and/or butylene, styrene copolymers, in particular SEBS, SEP block copolymers, and also polyolefin-alkyl (meth)acrylate copolymers. Particular preference is given to copolymers of ethylene and methyl acrylate, ethylene and methyl methacrylate and ethylene and butyl acrylate.

In particular, however, it is preferable not to use, in combination with (B), any other impact modifier component that does not correspond to the definition of the component (B), i.e. not even component E2.

The moulding compositions of the invention can comprise other additional substances (E3), e.g. from the group of the light stabilizers, UV stabilizers, UV absorbers or UV blockers, lubricants, dyes, nucleating agents, metallic pigments, antistatic agents, conductivity additives, mould-release agents, optical brighteners, and mixtures of the additional substances mentioned. The moulding compositions of the invention can use by way of example carbon black and/or carbon nanotubes as antistatic agents. However, carbon black can also be used to improve the black colouration of the moulding composition.

The moulding compositions of the invention optionally also comprise flame retardants as component (E4), in particular halogen-free, phosphorus-containing flame retardants, so that the moulding compositions achieve the UL 94 V-0 fire-protection classification. It is preferable to use the flame retardants (E4) at a concentration from 8 to 18% by weight, preferably from 9 to 16% by weight and particularly preferably from 10 to 15% by weight, based on the moulding composition.

It is preferable that the flame retardants of phosphazenes, phosphinic salts and/or diphosphinic salts, and also optionally nitrogen-containing synergists, where the latter are preferably selected from melamine or condensates of melamine, in particular melem, melam, melon, or reaction products of melamine with polyphosphoric acid, or reaction products of condensates of melamine with polyphosphoric acid, and mixtures thereof, in particular melamine polyphosphate.

Preference is given to a flame retardant of the component (E4) in the form of metal salt of phosphinic acid and/or diphosphinic acid and/or polymers thereof, in which the metal ion is from the $2^{nd}$ or $3^{rd}$ main or transition group of the Periodic Table of the Elements and the organic moieties are preferably C1-C10-alkyl, linear or branched and/or aryl, alkylene, arylene, alkylarylene or arylalkylene. Preference is in particular given to aluminium, calcium, barium and zinc as metal ion.

According to one preferred embodiment the moulding composition is free from flame retardants, in particular free from phosphorus-containing flame retardants.

Generally, therefore, according to another preferred embodiment the component (E), proportions of which present in the moulding composition are preferably in the range from 0 to 15% by weight, with particular preference in the range from 2 to 10% by weight, is fillers, optionally in surface-treated form, selected from the following group: talc, mica, silicate, quartz, titanium dioxide, wollastonite, kaolin, amorphous silicas, magnesium carbonate, magnesium hydroxide, chalk, lime, feldspar, barium sulphate, solid or hollow glass beads or ground glass, and in particular ground, flat glass fibres, permanently magnetic or magnetizable metal compounds and/or alloys, flame retardants, in particular halogen-free flame retardants, aliphatic polyamides, in particular nylon-6 and/or amorphous, semiaromatic polyamides, in particular PA 6I/6T, light stabilizers, UV stabilizers, UV absorbers or UV blockers, lubricants, dyes, nucleating agents, metallic pigments, antistatic agents, conductivity additives, mould-release agents, optical brighteners, and mixtures thereof.

The thermoplastic moulding compositions of the invention feature good heat resistance, good mechanical properties longitudinally and perpendicularly to the direction of processing, and high impact resistance and notched impact resistance. These moulding compositions are therefore suitable for the production of mouldings of any type, in particular for the applications mentioned below. The moulding compositions of the invention are particularly suitable for applications in which the mouldings or components have exposure to high loadings perpendicularly to the direction of the fibres (where this means the reinforcing fibre (C)), in particular to impact stress, or must have high fracture energies. This applies by way of example to highly stressed automobile parts such as belt systems, door and hatchback locks, parts of the manual or automatic gear-shift system and of the brake system, fastening elements such as nails and screws, pressure valves, hydraulic components, valve blocks, fittings, household equipment, engine bearings, or parts of coffee machines.

The present invention further provides a use of a polyamide moulding composition as described above for the production of a moulding, in particular of a component for use in the following sectors:

Accordingly, the present invention further provides a moulding made of a polyamide moulding composition as described above, preferably for use in one of the following sectors:
electrical equipment, sports items, optical equipment, sanitary and hygiene items, household equipment, communications technology, automobile technology, energy and drive technology, mechanical engineering, medical equipment, and with particular preference in all of these instances in the form of housings or housing parts, functional elements, devices for the transport, or the storage, of media, in particular in the form of hollow bodies, load-bearing elements, frame elements, profiles, and also combinations thereof.

The present invention also provides processes for the production of these mouldings, preferably characterized in that the moulding is produced in an injection-moulding process, blow-moulding process or extrusion process.

The present invention also provides uses of these mouldings in any of the following sectors:
electrical equipment, sports items, optical equipment, sanitary and hygiene items, household equipment, communications technology, automobile technology, energy and drive technology, mechanical engineering, medical equipment, and with particular preference in all of these instances in the form of housings or housing parts, functional elements, devices for the transport, or the storage, of media, in particular in the form of hollow bodies, load-bearing elements, frame elements, profiles, and combinations thereof, in particular as part or entire housing of electronic, with particular preference portable equipment.

The present invention therefore provides a use of a polyamide moulding composition as described above for the production of a moulding, in particular of a component for use in the following sectors:
Electrical Equipment Sector
    stop elements and/or adjustment elements for electrical hand tools with or without integrated electrical functions (moulded interconnect devices, MID)
    connecting rod and/or piston for hammer drill in homogeneous form, i.e. made of one material or as hybrid part, made of a combination of materials
    housings or gearbox housings for angle grinders, drilling machines, electrical planing machines or grinding machines with or without integrated electrical functions (MID) in homogenous form or as hybrid part, where certain functional regions (e.g. force-transmission areas, sliding areas, decorative visible regions, grip region) can be made of another material that is compatible or incompatible (e.g. for controlled delamination or deformation, defined breakage site, force-limitation or torque-limitation)

devices for receiving tools, e.g. chucks and/or fixing systems sewing-machine housings or sliding tables with or without integrated electrical functions (MID)

Sanitary and Hygiene Sector
  housings and/or functional elements (e.g. for pumps, gear systems, valves) for oral irrigators, toothbrushes, comfort toilets, shower cubicles, hygiene centres with or without integrated electrical functions (MID) in homogeneous form or as hybrid part
  pump housing, valve housing or water meter housing with or without integrated electrical functions (MID) in homogeneous form or as hybrid part Household Equipment Sector
  housings and/or functional elements for mechanical, electrical or electromechanical locking systems, bolting systems, or sensors with or without integrated electrical functions (MID) for
  refrigerators, chest freezers
  ovens, cookers, food steamers
  dishwashers Automobile Sector
  housings and/or holders with or without integrated electrical functions (MID) in homogeneous form as hybrid part for
  control elements/switches (e.g. for exterior mirror adjustment, seat position adjustment, lighting, direction indicators)
  interior sensors, e.g. for seat occupation
  exterior sensors (e.g. for parking aids, distance-measurement devices using ultrasound or using radar)
  sensors in the engine compartment (e.g. vibration sensors or knock sensors)
  interior and exterior lighting
  motors and/or drive elements in the interior or exterior sector (e.g. for seat comfort functions, exterior rear mirror adjustment, main headlamp adjustment and/or readjustment, steering-angle-adaptive lighting)
  vehicle drive control systems (e.g. for conveying fluids and/or regulating for example fuel, air, coolant, lubricant)
  mechanical functional elements and/or sensor housings with or without integrated electrical functions (MID) for
  locking systems, bolting systems, closure systems, e.g. for hinged doors in vehicles, sliding doors, bonnets or engine-compartment covers, hatchbacks, vehicle windows
  mechanical, pneumatic or hydraulic functional elements for gear selection in manual and automatic gearboxes and elements of the same type in brake systems Mechanical Engineering
  ISO standard parts and/or machine elements (e.g. screws, nuts, bolts, wedges, shafts, gearwheels) in standard dimensions or with design specific or in homogeneous form
  ISO standard parts and/or machine elements (e.g. screws, nuts, bolts, wedges, shafts) in standard dimensions or with application-specific design or as hybrid part, where certain functional regions (e.g. force-transmission areas, sliding areas, decorative visible regions) can be made of another material that is compatible or incompatible (e.g. for controlled delamination or deformation, defined breakage site, force-limitation or torque-limitation)
  stands, stand feet, bases for mechanical machines, e.g. stand-mounted drilling machines, table-mounted drilling machines, milling machines or combi machines for metalworking and/or woodworking
  insert parts, e.g. screw-threaded bushes
  self-tapping screws Power Engineering and Drive Technology Sector:
  frames, housings, support parts (substrate) and/or fastening elements for solar cells with or without integrated electrical functions (MID) in homogeneous form or as hybrid part
  adjustment and/or readjustment elements (e.g. for bearings, hinges, joints, tension rods, stop rods) for collectors
  pump housings and/or valve housings with or without integrated electrical functions (MID) in homogeneous form or as hybrid part Medical Equipment Sector
  frames, housings, support parts with or without integrated electrical functions (MID) in homogeneous form or as hybrid part for monitoring equipment and/or equipment to support vital functions
  single-use instruments, e.g. scissors, clamps, forceps, knife handles in homogeneous form or as hybrid part
  structures for the temporary or emergency fixing of fractures in homogeneous form or as hybrid part
  walking aids with or without integrated electrical functions (MID) and/or sensors to monitor loading in homogeneous form or as hybrid part.

Further embodiments are provided in the dependent claims.

DESCRIPTION OF PREFERRED EMBODIMENTS

Preferred embodiments of the invention are described below with reference to the Inventive Examples, which serve merely for illustration and are not to be interpreted as restrictive.

The Examples according to Table 1 used the materials specified below:

PA type A: Polyamide PA 6T/6I (ratio of 6T to 6I units 70:30, $\eta_{rel}$=1.58, terminal amino groups: 60 mmol/kg, terminal carboxy groups: 160 mmol/kg, melting point 325° C.)

GMA copolymer 1 Lotader AX8840, copolymer of 92% of ethene and 8% of glycidyl methacrylate, MFR=5 g/10 min. (ISO 1133, 190° C./2.16 kg), Arkema GMA copolymer 2 Lotader AX8900, copolymer of 67% of ethene, 25% of methyl acrylate and 8% of glycidyl methacrylate, MFR=6 g/10 min. (ISO 1133, 190° C./2.16 kg), Arkema GMA copolymer 3 Elvaloy PTW, copolymer of 67% of ethene, 28% of butyl acrylate and 5% of glycidyl methacrylate, MFR=12 g/10 min. (ISO 1133, 190° C./2.16 kg), DuPont GMA copolymer 4 Igetabond E, copolymer of 88% of ethene and 12% of glycidyl methacrylate, MFR=3 g/10 min. (ISO 1133, 190° C./2.16 kg), Sumitomo IM-1 Tafmer MH7010, copolymer of ethene and butene grafted with maleic anhydride, Mitsui IM-2 Fusabond N MN493D, copolymer of ethene and octene grafted with maleic anhydride, DuPont IM-3 Kraton EG1901GT, block copolymer of ethene, butene and styrene grafted with maleic anhydride, KRATON Polymers Group IM-4 Paraloid BTA753, copolymer of butadiene, methyl methacrylate and styrene, Rohm & Haas IM-5 Lotader 4700, copolymer of ethene and ethyl acrylate grafted with maleic anhydride, Arkema IM-6 Lotryl 29MA03, copolymer of ethene and methyl acrylate, Arkema IM-7 Lucofin 1494 H, copolymer of ethene and butyl acrylate grafted with maleic anhydride, Lucobit Thermoplastic Polyolefins Glass fibre type A Vetrotex 995 chopped glass fibres of E glass, length 4.5 mm and diameter 10 μm (circular cross section) from Owens Corning Fiberglas Additives Mixture of kaolin, potassium iodide (0.18% based on moulding composition), copper iodide (0.06%, based on moulding composition).

The moulding compositions having the compositions in Tables 1, 2 and 3 were produced in a Werner and Pfleiderer ZSK 25 twin-screw extruder. The components A and C to E were metered into the feed zone. The glass fibres (B) were metered into the polymer melt by way of a side feeder 3 barrel units upstream of the die.

The barrel temperature was set as rising profile up to 350° C. 10 kg of throughput were achieved at from 150 to 200 rpm. The compounded materials were discharged as strand from a die of diameter 3 mm and pelletized after water cooling. After pelletization and drying for 24 h at 110° C., the properties of the pellets were measured and the test samples were produced.

The test samples were produced in an Arburg Allrounder injection-moulding machine, with the cylinder temperatures set at from 250° C. to 350° C. and a peripheral velocity of the screw of 15 m/min. The mould temperature selected was 80 to 130° C.

The measurements were made in accordance with the following standards on the following test samples.

Tensile modulus of elasticity was determined in accordance with ISO 527 with tensile velocity 1 mm/min, yield stress, ultimate tensile strength, tensile strain at break and fracture energy were determined in accordance with ISO 527 with tensile testing velocity 50 mm/min (unreinforced variants) or with tensile testing velocity 5 mm/min (reinforced variants) at a temperature of 23° C., using as test sample an ISO tensile specimen, standard: ISO/CD 3167, type A1, 170×20/10×4 mm. Tensile modulus of elasticity, ultimate tensile strength, tensile strain at break and fracture energy perpendicularly to the direction of processing were determined by carrying out the tensile test described above with specific BIAX test samples (published in Noss' Ovra Staff Magazine, December 2006, No. 12, Volume 29, EMS-CHEMIE AG).

Charpy impact resistance and notched impact resistance were measured in accordance with ISO 179 on an ISO test specimen, standard: ISO/CD 3167, type B1, 80×10×4 mm at temperature 23° C.

Thermal properties (melting point ($T_m$), enthalpy of fusion (ΔHm), glass transition temperature ($T_g$)) were determined on the basis of the ISO standard 11357-11-2 on the pellets. The heating rate used for the differential scanning calorimetry (DSC) was 20° C./min.

0.5% by weight m-cresol solutions were used to measure relative viscosity ($\eta_{rel}$) in accordance with DIN EN ISO 307 at 20° C. The sample used comprised pellets. MVR (melt volume-flow rate) is determined on the pellets in accordance with ISO 1133 at 340° C. with 10 kg loading.

Heat deflection temperature was determined in the form of HDT A (1.8 MPa) and HDT C (8 MPa) in accordance with ISO 75 on ISO impact specimens measuring 80×10×4 mm.

TABLE 1

Composition and properties of Inventive Examples IE1 to IE6

| Components | Unit | IE1 | IE2 | IE3 | IE4 | IE5 | IE6 |
|---|---|---|---|---|---|---|---|
| PA type A | % by wt. | 53.6 | 56.6 | 53.6 | 53.6 | 53.6 | 53.6 |
| GMA polymer 1 | % by wt. | 6 | 3 | 3 | | | |
| GMA polymer 2 | % by wt. | | | | 6 | | |
| GMA polymer 3 | % by wt. | | | | | 6 | |
| GMA polymer 4 | % by wt. | | | | | | 6 |
| IM-6 | % by wt. | | | 3 | | | |
| Glass fibres type A | % by wt. | 40 | 40 | 40 | 40 | 40 | 40 |
| Additives | % by wt. | 0.4 | 0.4 | 0.4 | 0.4 | 0.4 | 0.4 |
| MVR 340/10 | cm³/10 min | 23 | 48 | 43 | 18 | 56 | 15 |
| ISO tensile modulus of elasticity | MPa | 12 000 | 12 900 | 12 400 | 12 100 | 11 900 | 12 400 |
| ISO ultimate tensile strength | MPa | 206 | 210 | 211 | 190 | 183 | 214 |
| ISO tensile strain at break | % | 2.8 | 2.5 | 2.7 | 2.5 | 2.3 | 2.9 |
| ISO fracture energy | J | 10.5 | 9.7 | 11 | 8.5 | 7.7 | 10.9 |
| Transverse tensile modulus of elasticity | MPa | 7400 | 8300 | 7300 | 6500 | 6800 | 7500 |
| Transverse ultimate tensile strength | MPa | 97 | 81 | 101 | 83 | 84 | 102 |
| Transverse tensile strain at break | % | 1.7 | 1.2 | 1.8 | 1.5 | 1.5 | 1.9 |
| Transverse fracture energy | J | 0.4 | 0.2 | 0.5 | 0.3 | 0.3 | 0.5 |
| Impact resistance, 23° C. | kJ/m² | 90 | 78 | 91 | 78 | 68 | 92 |
| Notched impact resistance, 23° C. | kJ/m² | 14 | 12 | 13 | 12 | 10 | 15 |
| HDT A (1.8 MPa) | ° C. | 260 | 265 | 257 | 254 | 250 | 260 |
| HDT C (8 MPa) | ° C. | 146 | 142 | 144 | 143 | 142 | 145 |

TABLE 2

Composition and properties of Inventive Examples IE7 to IE9 and Comparative Examples CE1 to CE3

| Components | Units | IE7 | IE8 | IE9 | CE1 | CE2 | CE3 |
|---|---|---|---|---|---|---|---|
| PA type A | % by wt. | 62.6 | 59.6 | 76.1 | 59.6 | 53.6 | 53.6 |
| GMA polymer 1 | % by wt. | 7 | 10 | 8.5 | | | |
| IM-4 | % by wt. | | | | | | 6 |
| IM-5 | % by wt. | | | | | 6 | |
| Glass fibres type A | % by wt. | 30 | 30 | 15 | 40 | 40 | 40 |
| Additive | % by wt. | 0.4 | 0.4 | 0.4 | 0.4 | 0.4 | 0.4 |
| MVR 340/10 | cm$^3$/10 min | 22 | 6 | 23 | 62 | 50 | 82 |
| ISO tensile modulus of elasticity | MPa | 9300 | 8600 | 5500 | 13 800 | 12 300 | 12 900 |
| ISO ultimate tensile strength | MPa | 177 | 148 | 125 | 237 | 147 | 215 |
| ISO tensile strain at break | % | 3.1 | 2.7 | 3.9 | 2.3 | 1.5 | 2.3 |
| ISO fracture energy | J | 10.2 | 7.4 | 10.5 | 9.6 | 3.6 | 8.8 |
| Transverse tensile modulus of elasticity | MPa | 5600 | 5900 | 5000 | 9400 | 6800 | 9000 |
| Transverse ultimate tensile strength | MPa | 106 | 103 | 116 | 74 | 62 | 58 |
| Transverse tensile strain at break | % | 2.6 | 2.9 | 4.4 | 0.8 | 1.0 | 0.6 |
| Transverse fracture energy | J | 0.7 | 0.8 | 1.5 | 0.1 | 0.2 | 0.1 |
| Impact resistance, 23° C. | kJ/m$^2$ | 78 | 83 | 73 | 69 | 46 | 64 |
| Notched impact resistance, 23° C. | kJ/m$^2$ | 13 | 14 | 11 | 10 | 9 | 9 |
| HDT A (1.8 MPa) | ° C. | — | — | — | 280 | 263 | 276 |
| HDT C (8 MPa) | ° C. | — | — | — | 145 | 145 | 145 |

TABLE 3

Composition and properties of Comparative Examples CE4 to CE9

| Components | Unit | CE4 | CE5 | CE6 | CE7 | CE8 | CE9 |
|---|---|---|---|---|---|---|---|
| PA type A | % by wt. | 53.6 | 53.6 | 53.6 | 53.6 | 69.6 | 84.6 |
| IM-1 | % by wt. | | | 6 | | | |
| IM-2 | % by wt. | | 6 | | | | |
| IM-3 | % by wt. | 6 | | | | | |
| IM-7 | % by wt. | | | | 6 | | |
| Glass fibres type A | % by wt. | 40 | 40 | 40 | 40 | 30 | 15 |
| Additives | % by wt. | 0.4 | 0.4 | 0.4 | 0.4 | 0.4 | 0.4 |
| MVR 340/10 | cm$^3$/10 min | 55 | 52 | 53 | 68 | 74 | 68 |
| ISO tensile modulus of elasticity | MPa | 11 800 | 12 000 | 11 700 | 12 500 | 10 700 | 6700 |
| ISO ultimate tensile strength | MPa | 145 | 127 | 113 | 148 | 198 | 123 |
| ISO tensile strain at break | % | 1.9 | 1.6 | 1.5 | 1.6 | 2.3 | 2.0 |
| ISO fracture energy | J | 5.3 | 3.7 | 3.2 | 4.0 | 7.4 | 3.7 |
| Transverse tensile modulus of elasticity | MPa | 5900 | 5800 | 4900 | 7100 | 7700 | 6300 |
| Transverse ultimate tensile strength | MPa | 70 | 66 | 59 | 74 | 74 | 76 |
| Transverse tensile strain at break | % | 1.4 | 1.4 | 1.4 | 1.4 | 1.0 | 1.3 |
| Transverse fracture energy | J | 0.3 | 0.2 | 0.3 | 0.2 | 0.2 | 0.2 |
| Impact resistance, 23° C. | kJ/m$^2$ | 45 | 40 | 33 | 39 | 53 | 28 |
| Notched impact resistance, 23° C. | kJ/m$^2$ | 9 | 9 | 8 | 8 | 9 | 5.4 |
| HDT A (1.8 MPa) | ° C. | 245 | 253 | 237 | 256 | — | — |
| HDT C (8 MPa) | ° C. | 138 | 143 | 139 | 140 | — | — |

The heat deflection temperature (HDT A and HDT C) of the moulding compositions of the invention reinforced with 40% by weight of glass fibres is reduced by from 15 to 35° C. in comparison with the non-impact-modified moulding composition (CE1), but is at the level of the moulding compositions (CE2-CE7) provided with conventional IM. Among these, only the CE3 exhibits an unusually high value, the impact modifier here being a core-shell-system with HDT A of 278° C. HDT A in the range from 250 to 265° C. and HDT C in the range from 135 to 46° C. are good.

Ultimate tensile strength is likewise lower than for the unmodified moulding composition CE1, but the values are still better than those for conventional IM: from 183 to 210 MPa in comparison with from 113 to 148 MPa. Again, the moulding composition with IM-4 is an exception, achieving an ultimate tensile strength of 215 MPa.

The moulding compositions modified according to the invention achieve high tensile strain at break values of from 2.3 to 2.9%, whereas moulding compositions modified with conventional IM only achieve tensile strain values in the range from 1.5 to 1.9%. The moulding composition CE3, modified with the core-shell material IM-4, achieves a tensile strain at break of 2.3%, which is identical with that of the unmodified moulding composition.

The fracture energy parallel to the direction of processing is again higher for the Inventive Examples than for the moulding compositions of the prior art. Moulding composition CE3, produced using IM-4, is again the exception. Improvement of fracture energy in comparison with the unmodified variant CE1 can be achieved only by use of the component B of the invention.

Values for ultimate tensile strength, tensile strain at break and fracture energy perpendicularly to the direction of processing are always good for the moulding compositions of the invention. It is also quite clear that the product modified with the core-shell material IM-4 is inferior in terms of these "transverse properties" (measured perpendicularly to the direction of processing). The moulding compositions of the invention are also significantly superior to the Comparative Examples in relation to impact resistance and notched impact resistance. Here again, the core-shell system IM-4 fails.

It is therefore only the moulding compositions of the invention that comply with the requirement for simultaneous
  good heat deflection temperature (HDT A being at least 245° C., preferably at least 250° C., and HDT C being at least 130° C., preferably at least 140° C.)
  high ultimate tensile strength ($UTS_{long.}$) and tensile strain at break ($TSB_{long.}$) in the direction of processing ($UTS_{long.}$ (40% GF)≥160 MPa, preferably ≥180 MPa; $TSB_{long.}$≥2.3%, preferably ≥2.5%)
  high longitudinal fracture energy ($FE_{long.}$) in the direction of processing ($FE_{long.}$≥7, preferably ≥9)
  high ultimate tensile strength ($UTS_{trans.}$) and tensile strain at break ($TSB_{trans.}$) perpendicularly to the direction of processing ($UTS_{trans.}$ (40% GF)≥75 MPa, preferably ≥80 MPa; $TSB_{trans.}$≥1.0%, preferably ≥1.5%)
  high fracture energy ($FE_{trans.}$) perpendicularly to the direction of processing ($FE_{trans.}$≥0.2, preferably ≥0.3)
  and high impact resistance (IR) and notched impact resistance (NIR) at room temperature (IR≥65 kJ/m$^2$, preferably ≥70 kJ/m$^2$; NIR≥9 kJ/m$^2$, preferably ≥11 kJ/m$^2$).

All the above Examples comprise fibrous reinforcing materials, and indeed this component (C) is an essential constituent of the polyamide moulding composition according to the present invention. Surprisingly, it has been found that the presence of the component (B) has an advantageous effect on the properties of the polyamide moulding composition only when the polyamide moulding composition actually comprises fibre reinforcement. This is revealed by the Comparative Examples CE10-CE12 presented below, in which no glass fibres are present in the moulding composition:

| Component | Unit | CE10 | CE11 | CE12 |
|---|---|---|---|---|
| PA type A | % by wt. | 89.3 | 89.3 | 99.2 |
| IM 1 | % by wt. | 10 | | |
| GMA polymer 1 | % by wt. | | 10 | |
| Glass fibres type A | % by wt. | 0 | 0 | 0 |
| Additives | % by wt. | 0.7 | 0.7 | 0.8 |

| Component | Unit | CE10 | CE11 | CE12 |
|---|---|---|---|---|
| Longitudinal tensile modulus of elasticity | MPa | 3800 | 3500 | 4200 |
| Longitudinal ultimate tensile strength | MPa | 115 | 117 | 128 |
| Longitudinal tensile strain at break | % | 11 | 12 | 3.4 |
| Longitudinal fracture energy | J | 5.2 | 5.4 | 1.1 |
| Transverse tensile modulus of elasticity | MPa | 3300 | 3200 | 4100 |
| Transverse ultimate tensile strength | MPa | 119 | 116 | 123 |
| Transverse tensile strain at break | % | 12 | 13 | 3.2 |
| Transverse fracture energy | J | 5.5 | 5.5 | 1.0 |
| Impact resistance, 23° C. | kJ/m$^2$ | NF | NF | 50 |
| Notched impact resistance, 23° C. | kJ/m$^2$ | 22 | 21 | 4.5 |

In relation to the unreinforced moulding compositions in Comparative Examples CE10 to CE12 it can be stated that if there are any differences at all relating to mechanical properties in and perpendicularly to the direction of processing (injection moulding) they are only minimal. The impact resistance and notched impact resistance values for the polymer PA type A (PA 6T/6I, cf. above) become significantly better, irrespective of the type of impact modifier added. Tensile strain at break and fracture energy are moreover markedly improved in comparison with Comparative Example CE12, not only in but also perpendicularly to the direction of injection moulding. There are also almost no discernible differences in transverse and longitudinal ultimate tensile strength. If, therefore, consideration is restricted to the unreinforced polymer, for example PA type A, there is no motivation to search for an impact modifier which in particular would improve mechanical properties perpendicularly to the direction of processing.

The invention claimed is:

1. A polyamide moulding composition consisting of the following components:
  (M) 32 to 84.9% by weight of a mixture consisting of (A) and (B) in the following proportions:
    (A) 85 to 97% by weight of semicrystalline, semiaromatic polyamide with at least 52 mol % content of terephthalic acid, based on the entirety of dicarboxylic acid present, and with 100 mol % of one or more aliphatic diamines having from 4 to 18 carbon atoms, based on the entirety of diamines present, with a melting point above 270° C., or a mixture of such polyamides;
    (B) 3 to 15% by weight of copolymer of, at least one of glycidyl acrylate and glycidyl methacrylate, with at least one other monomer having at least one olefinic carbon-carbon double bond, or a mixture of such copolymers;
  where the entirety of (A) and (B) gives 100% of the component (M);
  (C) 15 to 65% by weight of fibrous reinforcing materials;
  (D) 0.1 to 3.0% by weight of heat stabilizers;
  (E) 0 to 25% by weight of at least one of auxiliaries or additives different from components (C) and (D), or polymers different from (A) and (B),
  wherein the entirety of (M), (C) and (D) makes up 100% by weight or, respectively, the entirety of (M), (C), (D) and (E) makes up 100% by weight, with the proviso that the polyamide moulding composition is free from grafted impact modifiers.

2. The polyamide moulding composition according to claim 1, wherein the proportion of (M) in the polyamide moulding composition is in the range of 35 to 79.8% by weight.

3. The polyamide e moulding composition according to claim 1, wherein the proportion of (M) in the polyamide moulding composition is in the range of 40 to 74.75% by weight.

4. The polyamide moulding composition according to claim 1, wherein the proportion of (M) in the polyamide moulding composition is in the range of 45 to 69.8% by weight.

5. The polyamide moulding composition according to claim 1, wherein, in each case based on the entirety of (A) and (B) as 100% of the component (M), the proportion of the component (A) present is in the range of 88 to 97% by weight, and the proportion of the component (B) is correspondingly in the range of 3 to 12% by weight.

6. The polyamide moulding composition according to claim 1, wherein, in each case based on the entirety of (A) and (B) as 100% of the component (M), the proportion of the component (A) present is in the range of 89 to 97% by weight, and the proportion of the component (B) is correspondingly in the range of 3 to 11% by weight.

7. The polyamide moulding composition according to claim 1, wherein, in each case based on the entirety of (A) and (B) as 100% of the component (M), the proportion of the component (A) present is 90 to 97% by weight and the proportion of the component (B) is correspondingly in the range of 3 to 10% by weight.

8. The polyamide moulding composition according to claim 1, wherein, in each case based on the entirety of (A) and (B) as 100% of the component (M), the proportion of the component (A) present is in the range of 92 to 97% by weight, and the proportion of the component (B) is correspondingly in the range of 3 to 8% by weight.

9. The polyamide moulding composition according to claim 1, wherein the component (A) is a semiaromatic polyamide based on terephthalic acid with at least 54 mol % content of terephthalic acid, based on the entirety of the dicarboxylic acid used.

10. The polyamide moulding composition according to claim 1, wherein the component (A) is a semiaromatic polyamide based on terephthalic acid with at least 57 mol %, content of terephthalic acid, based on the entirety of the dicarboxylic acid used.

11. The polyamide moulding composition according to claim 1, wherein the component (A) is a semiaromatic polyamide based on terephthalic acid with at least 52 mol %, content of terephthalic acid, in combination with isophthalic acid as further diacid in a proportion of at least 18 mol %, based in each case on the entirety of the dicarboxylic acid used.

12. The polyamide moulding composition according to claim 1, wherein the component (A) is a semiaromatic polyamide based on terephthalic acid with at least 54 mol % content of terephthalic acid, in combination with isophthalic acid as further diacid in a proportion of at least 26 mol %, based in each case on the entirety of the dicarboxylic acid used.

13. The polyamide moulding composition according to claim 1, wherein the component (A) is a semiaromatic polyamide based on terephthalic acid with at least 52 mol %, content of terephthalic acid, based on the entirety of the dicarboxylic acid used.

14. The polyamide moulding composition according to claim 1, wherein the component (A) is selected as 6T/6I with from 62 to 82 mol % content of terephthalic acid, based on the entirety of the dicarboxylic acid used.

15. The polyamide moulding composition according to claim 1, wherein the component (B) is a copolymer of at least one of glycidyl acrylate and glycidyl methacrylate and of at least one other unsaturated monomer having at least one carbon-carbon double bond, where the concentration of glycidyl acrylate, glycidyl methacrylate or the mixture thereof is in the range of 5 to 15% by weight based on the entirety of all the monomers in the copolymer.

16. The polyamide moulding composition according to claim 15, wherein the other unsaturated monomer is at least one of a monounsaturated olefin, having from 2 to 8 carbon atoms, a (meth)acrylic ester having from 4 to 12 carbon atoms, or vinyl acetate.

17. The polyamide moulding composition according to claim 15, wherein the copolymer (B) comprises, alongside at least one of glycidyl acrylate and glycidyl methacrylate, at least one other unsaturated monomer selected from the group consisting of: ethene, propene, 1-butene, 2-butene, 1-pentene, 2-pentene, methyl (meth)acrylate, ethyl (meth)acrylate, propyl (meth)acrylate, isopropyl (meth)acrylate, butyl (meth)acrylate, vinyl acetate and combinations thereof.

18. The polyamide moulding composition according to claim 15, wherein the other unsaturated monomer is at least one of a monounsaturated α-olefin, having from 2 to 8 carbon atoms, a (meth)acrylic ester having from 4 to 12 carbon atoms, or vinyl acetate.

19. The polyamide moulding composition according to claim 1, wherein the component (B) is a copolymer of glycidyl methacrylate and ethene, and also optionally of other olefinically unsaturated monomers, where the content of ethene is in the range of 50 to 95% by weight, where the melt flow rate (MFR) determined in accordance with ISO 1133 at 190° C. with an applied weight of 2.16 kg is in the range of 2 to 20 g/10 min.

20. The polyamide moulding composition according to claim 1, wherein the component (B) is a copolymer of at least one of glycidyl acrylate and glycidyl methacrylate and of at least one other unsaturated monomer having at least one carbon-carbon double bond, where the concentration of glycidyl acrylate, glycidyl methacrylate or the mixture thereof is in the range of 7 to 14% by weight, based on the entirety of all the monomers in the copolymer.

21. The polyamide moulding composition according to claim 1, wherein the component (B) is a copolymer of glycidyl methacrylate and ethene, and also optionally of other olefinically unsaturated monomers, where the content of ethene is in the range of 65 to 93% by weight, where the melt flow rate (MFR) determined in accordance with ISO 1133 at 190° C. with an applied weight of 2.16 kg is in the range of 3 to 15 g/10 min.

22. The polyamide moulding composition according to claim 1, wherein the component (C) is glass fibres, carbon fibres, or a mixture of these fibres.

23. The polyamide moulding composition according to claim 1, wherein the component (C), the proportion of which present in the moulding composition is in the range of 20 to 60% by weight, is glass fibres, carbon fibres, or a mixture of these fibres.

24. The polyamide moulding composition according to claim 1, wherein the component (C), the proportion of which present in the moulding composition is in the range of 25 to 55% by weight, is glass fibres, carbon fibres, or a mixture of these fibres.

25. The polyamide moulding composition according to claim 1, wherein the component (C), is glass fibres with circular cross section, glass fibres with non-circular cross section, or a mixture of these glass fibres, where glass fibres with circular cross section with have a diameter in the range of 3 to 12 μm, and glass fibres with non-circular cross section have a dimension ratio of the primary cross-sectional axis to the secondary cross-sectional axis perpendicular thereto of more than 2.5, where the length of the primary cross-sectional axis is in the range of 5 to 35 μm, and the length of the secondary cross-sectional axis is in the range of 3 to 17 μm.

26. The polyamide moulding composition according to claim 1, wherein the component (C), is glass fibres with circular cross section, glass fibres with non-circular cross section, or a mixture of these glass fibres, where glass fibres with circular cross section have a diameter in the range of 5 to 12 μm, and glass fibres with non-circular cross section have a dimension ratio of the primary cross-sectional axis to the secondary cross-sectional axis perpendicular thereto from 3 to 5, where the length of the primary cross-sectional axis is in the range of 12 to 30 μm, and the length of the secondary cross-sectional axis is in the range of 4 to 10 μm.

27. The polyamide moulding composition according to claim 1, wherein component (D) is selected from the following group: compounds of the mono- or divalent copper, stabilizers based on secondary aromatic amines, stabilizers based on sterically hindered phenols, phosphites, phosphonites, and mixtures thereof.

28. The polyamide moulding composition according to claim 1, wherein component (D), the proportion of which present in the moulding composition is in the range of 0.15 to 2% by weight, is selected from the following group: compounds of the mono- or divalent copper, stabilizers based on secondary aromatic amines, stabilizers based on sterically hindered phenols, phosphites, phosphonites, and mixtures thereof.

29. The polyamide moulding composition according to claim 1, wherein component (D), the proportion of which present in the moulding composition is in the range of 0.17 to 1.5% by weight, is selected from the following group: compounds of the mono- or divalent copper, stabilizers based on secondary aromatic amines, stabilizers based on sterically hindered phenols, phosphites, phosphonites, and mixtures thereof.

30. The polyamide moulding composition according to claim 1, wherein component (E) is fillers, in surface-treated or surface-untreated form, selected from the following group: talc, mica, silicate, quartz, titanium dioxide, wollastonite, kaolin, amorphous silicas, magnesium carbonate, magnesium hydroxide, chalk, lime, feldspar, barium sulphate, solid or hollow glass beads or ground glass permanently magnetic or magnetizable metal compounds and/or alloys, flame retardants, aliphatic polyamides, or amorphous, semiaromatic polyamides, light stabilizers, UV stabilizers, UV absorbers or UV blockers, lubricants, dyes, nucleating agents, metallic pigments, antistatic agents, conductivity additives, mould-release agents, optical brighteners, and mixtures thereof.

31. The polyamide moulding composition according to claim 1, wherein component (E), the proportion of which present in the moulding composition is in the range of 0 to 15% by weight, is fillers, in surface-treated or surface-untreated form, selected from the following group: talc, mica, silicate, quartz, titanium dioxide, wollastonite, kaolin, amorphous silicas, magnesium carbonate, magnesium hydroxide, chalk, lime, feldspar, barium sulphate, solid or hollow glass beads or ground glass, permanently magnetic or magnetizable metal compounds or alloys, flame retardants, in aliphatic polyamides, and/or amorphous, semiaromatic polyamides, light stabilizers, UV stabilizers, UV absorbers or UV blockers, lubricants, dyes, nucleating agents, metallic pigments, antistatic agents, conductivity additives, mould-release agents, optical brighteners, and mixtures thereof.

32. The polyamide moulding composition according to claim 1, wherein component (E), the proportion of which present in the moulding composition is in the range of 2 to 10% by weight, is fillers, in surface-treated or surface-untreated form, selected from the following group: talc, mica, silicate, quartz, titanium dioxide, wollastonite, kaolin, amorphous silicas, magnesium carbonate, magnesium hydroxide, chalk, lime, feldspar, barium sulphate, solid or hollow glass beads or ground, flat glass fibres, permanently magnetic or magnetizable metal compounds and/or alloys, halogen-free flame retardants, nylon-6 and/or amorphous, semiaromatic PA 6I/6T, light stabilizers, UV stabilizers, UV absorbers or UV blockers, lubricants, dyes, nucleating agents, metallic pigments, antistatic agents, conductivity additives, mould-release agents, optical brighteners, and mixtures thereof.

33. A moulding made of a polyamide moulding composition according to claim 1.

34. A moulding according to claim 33 which is suitable for use in at least one of the following sectors: electrical equipment, sports items, optical equipment, sanitary and hygiene items, household equipment, communications technology, automobile technology, energy and drive technology, mechanical engineering, medical equipment.

35. A moulding according to claim 33 which is suitable for use in any of the following sectors: electrical equipment, sports items, optical equipment, sanitary and hygiene items, household equipment, communications technology, automobile technology, energy and drive technology, mechanical engineering, medical equipment, and in all of these instances in the form of housings or housing parts, functional elements, devices for the transport, or the storage, of media, in the form of hollow bodies, load-bearing elements, frame elements, profiles, and combinations thereof, as part or entire housing of electronic equipment including portable equipment.

36. A process for the production of a moulding according to claim 33, wherein it was produced in an injection-moulding process, blow-moulding process or extrusion process.

37. A moulding made of a polyamide moulding composition according to claim 1, for use in one of the following sectors:
  electrical equipment, sports items, optical equipment, sanitary and hygiene items, household equipment, communications technology, automobile technology, energy and drive technology, mechanical engineering, medical equipment.

38. A moulding made of a polyamide moulding composition according to claim 1, for use in one of the following sectors:
  electrical equipment, sports items, optical equipment, sanitary and hygiene items, household equipment, communications technology, automobile technology, energy and drive technology, mechanical engineering, medical equipment, and in all of these instances in the form of housings or housing parts, functional elements, devices for the transport, or the storage, of media, in the form of hollow bodies, load-bearing elements, frame elements, profiles, and combinations thereof.

* * * * *